United States Patent
Zen

(10) Patent No.: US 6,258,877 B1
(45) Date of Patent: Jul. 10, 2001

(54) METHOD OF PRODUCING MOLDED PRODUCTS FROM STRIPPED ROOFING MATERIAL

(75) Inventor: Vic De Zen, Woodbridge (CA)

(73) Assignee: Royal Group Technologies Limited, Woodbridge ( * ) Notice: Subject to any disclaimer, the term of this patent is extended or adjusted under 35 U.S.C. 154(b) by 0 days.

(21) Appl. No.: 09/206,223

(22) Filed: Dec. 7, 1998

(30) Foreign Application Priority Data

Dec. 9, 1997 (CA) .................................................. 2224531

(51) Int. Cl.⁷ .............................. C08L 95/00; C08J 5/00; B27N 3/08
(52) U.S. Cl. ........................... 524/59; 264/37.29; 264/68; 264/319; 264/331.11; 264/331.12; 264/331.13; 264/331.15; 264/331.17; 264/331.19; 106/275; 521/40
(58) Field of Search ................................ 52/518; 241/65; 521/40; 523/129; 428/903.3; 524/62, 59; 106/275; 269/37.29, 68, 319, 331.11, 331.12, 331.13, 331.15, 331.19, 331.17

(56) References Cited

U.S. PATENT DOCUMENTS

| 4,405,680 | * | 9/1983 | Hansen . |
| 4,726,846 | * | 2/1988 | Jackson et al. . |
| 5,312,858 | * | 5/1994 | Folson . |
| 5,938,130 | * | 8/1999 | Zickell . |

* cited by examiner

Primary Examiner—Peter Szekely

(57) ABSTRACT

A method of converting stripped roofing material into a useful product comprising feeding roofing material removed during repair or reroofing of a building roof into a shredder introducing particles of material from said shredder together with particles of thermoplastic material and a particulate filler material into a high intensity mixer to form a batch of material to be mixed, intensely mixing said batch of material to produce a heated mass of hot particles of roofing material and filler material coated with molten thermoplastic, then molding said heated mass under pressure into a desired end product. The invention also includes products produced utilizing said stripped roofing material.

15 Claims, 1 Drawing Sheet

METHOD OF PRODUCING MOLDED PRODUCTS FROM STRIPPED ROOFING MATERIAL

FIELD OF THE INVENTION

This invention relates to the handling of stripped roofing material such as shingles and tiles which are removed and replaced during the repair or reroofing of a building.

BACKGROUND OF THE INVENTION

At present, when a roof is to be repaired or reroofed, the old or damaged shingles or tiles, a large percentage of which are formed of asphalt are simply waste products which have to be trucked to a dump and unloaded. This disposal operation involves both transportation costs and a charge by the dump for accepting this waste material.

SUMMARY OF THE INVENTION

It is the object of the present invention to convert such old shingles or tiles into useful products. It is a further object of the invention to enable such conversion to be effected at the site of the shingle or tile removal.

A still further object is to convert such stripped roofing material into building products or elements which can be used at the removal site.

More particularly, according to the invention, the stripped roofing material is first shredded, then intensely and intimately mixed with particles of thermoplastic material and a particulate filler material to heat the mixture to bring the thermoplastic material to a viscous molten state whereby the molten thermoplastic material coats the hot shredded roofing particles and the hot filler particles to produce a hot moldable mass, then compression molding said mass to form a desired end product or products.

Because the process involves only a shredder, a motor driver mixer and a compression mold, the equipment necessary to carry out the method can readily be mounted on a truck, tractor or other vehicle and transported to the job site when the process can be carried out.

While many different products may be so formed depending on the mold used, examples of such products include interlocking blocks or bricks for driveways, walkways and the like, bricks or blocks for edging driveways, walkways or forming borders for planting areas, or blocks for forming patios and the like.

It is therefore another aspect of the invention whereby the use of the mobile shredder, mixer, and the selected compression mold can produce on the job site a product which can be advantageously used at that site.

For example, the resulting products such as interlocking blocks or tiles can then be used to provide an interlocking driveway or walkway to enhance the site.

It will be understood that, while not taking full advantage of the invention, the processing of the stripped roof material may be done away from the site, even when such stripped roof materials are no longer waste materials to be carted to the dump. Instead they are converted into valuable, useful products.

DETAILED DESCRIPTION ACCORDING TO THE PREFERRED EMBODIMENTS OF THE PRESENT INVENTION

Figure 1:
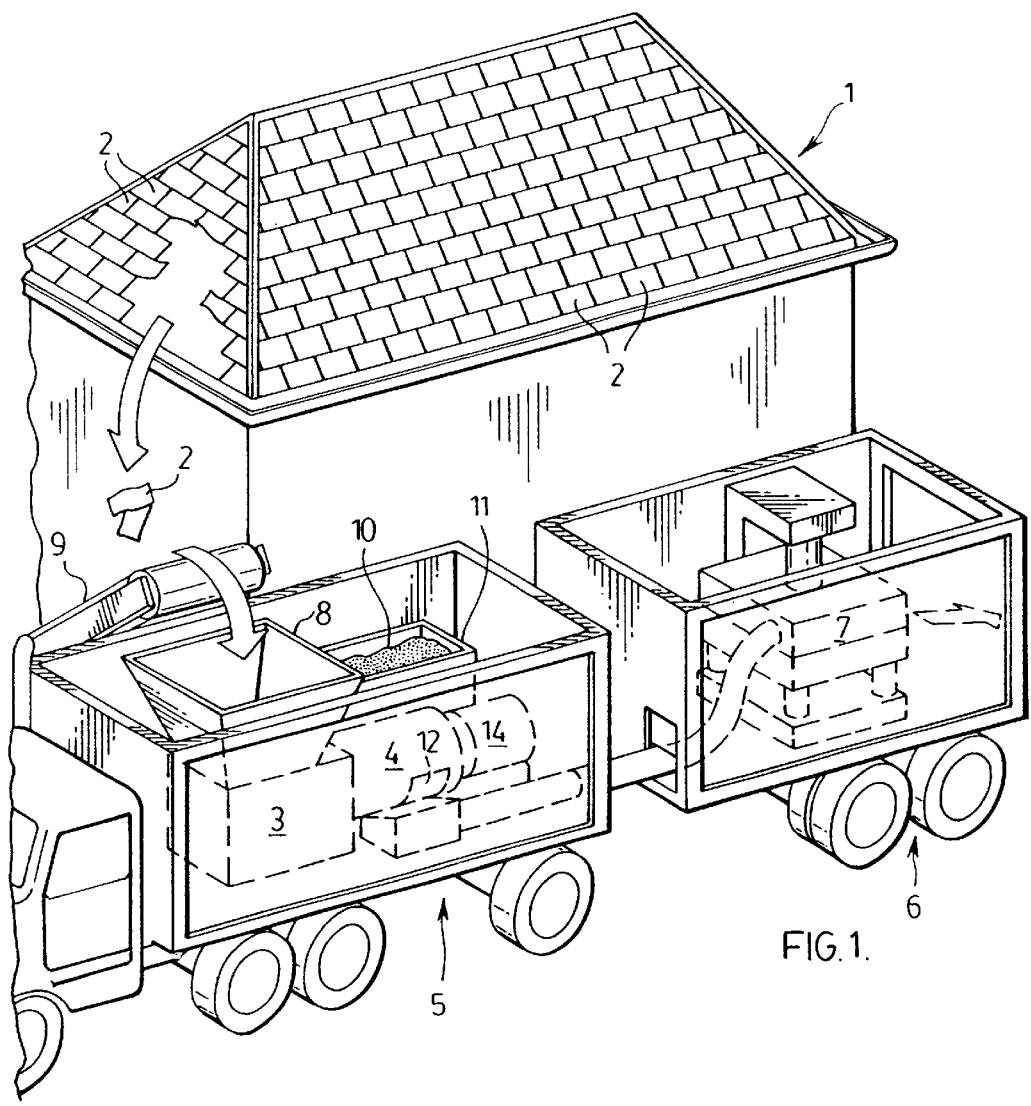
FIG. 1 is a perspective diagrammatic view illustrating the processing of roof shingles by on site vehicle transported processing equipment in accordance with the invention.

With reference to FIG. 1, there is illustrated a house 1 whose roofing material, for example asphalt shingles 2, are being removed prior to reroofing.

The equipment for converting the waste shingles shown comprises a vehicle mounted shredder 3 and a motor driven high intensity mixer 4 transported to the house site by truck 5. A trailer 6 is shown as carrying the vehicle mounted compression mold 7 which will be selected to form the desired product at the site. The discarded roofing pieces such as the shingles 2 are shown being delivered into the shredder hopper 8 by a belt 9 although they could be simply thrown into the hopper 8.

Figure 2:
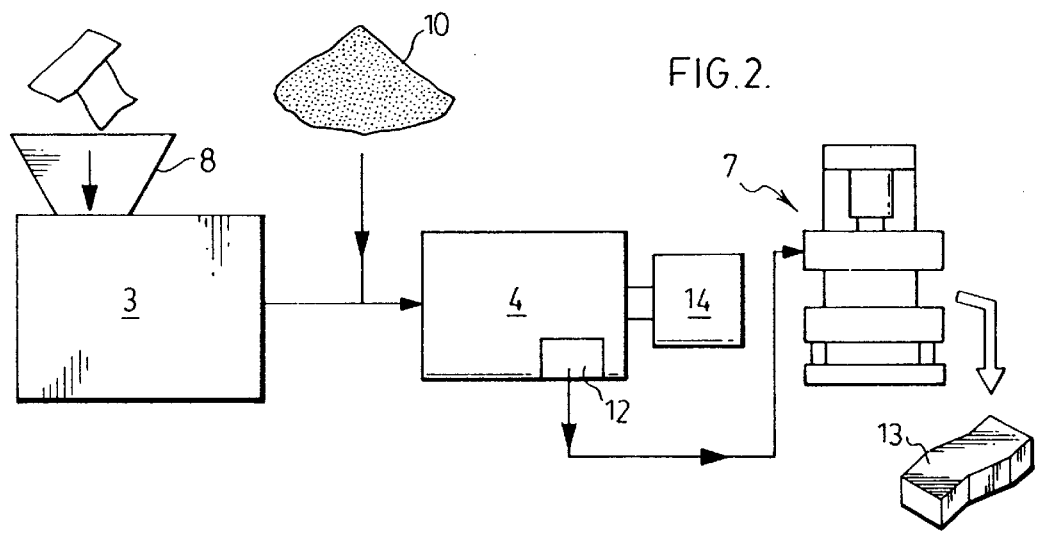
FIG. 2 is a process flow diagram illustrating the conversion of the roof material into a final product.

The shredded particles or pieces from the shredder 3 together with particles of thermoplastic material and a filler material are then fed as a batch into the mixer hopper 11 of the type in which motor driven high speed rotating blades cause the particles of material introduced into the mixer cylinder to collide at high speed and to impinge on the wall of the mixer giving rise to inner friction heating raising the temperature of the particles until the thermoplastic particles reach a molten temperature. At this point, the molten thermoplastic material coats and sticks to the hot roofing and filler particles to convert the batch 10 of the particulate material into a hot mass with the hot particles of roofing and filler coated and bound together by the thermoplastic material whereupon they are discharged out the discharge gate 12 of the mixer and transferred to the compression mold 7. This hot mass is then molded under pressure into the desired end products such as the interlocking brick or block 13 illustrated in FIG. 2.

If there is not enough power available from the house mains to drive the shredder or mixer motor 14, for example, then portable electrical generating equipment (not shown) can be provided.

The preferred filler material to be mixed with the shredded waste roofing material such as shredded asphalt shingles is sand which is readily available. However, other filler material such as waste slag particles, fly ash could also be used. The thermoplastic material can be any number of thermoplastics such as recycled or waste particles of PVC, polyethylene, polypropylene, polyethylene terephthalate (PET), nylon, ABS, and the like, preferably those thermoplastic particles that have relatively low melting points.

While shingles of asphalt material are very prevalent, the waste roofing material may comprise wood shingles, old roofing tar paper, or other bituminous material and can include broken tiles or the like.

The mixture of shredded roofing material, particles of thermoplastic material, and filler material may vary over a wide range. For example, the batch may comprise by weight 30% to 50% roofing particles, 30% to 50% filler material such as sand, and 10% to 40% of thermoplastic particles. Preferably the thermoplastic material comprises from about 20% to 40% of the mixture and the balance roughly an even blend of roofing particles and filler or sand.

By handling the waste roofing material at the job site, all costs of transporting waste material and paying for its acceptance into a dump are eliminated yet at the same time useful end products are produced. These end products which may be interlocking bricks 12 such as illustrated or any other number of products such as patio tiles or the like will comprise very durable products in which the particulate material comprising the roofing particles and the filler particles are bound together into a compacted mass as a result of being molded under pressure causing the molten plastic material to encapsulate and strongly bind together the particulate material.

While the full benefits of the invention are obtained by transporting the shredder, mixer and compression molder to the job site, it will be understood that the waste roofing materials may themselves be transported to a plant where the process is carried out to recover useful end products from this waste material. Alternatively, the roofing material could simply be shredded at the job site and transported to a plant where it could be used to form the desired end products.

It will be understood that various other alternatives and arrangements may be made without departing from the scope of the appended claims.

The embodiments of the invention in which an exclusive property or privilege is claimed are defined as follows:

1. A method of converting stripped roofing material into a useful product comprising feeding roofing material removed during repair or reroofing of a building roof into a shredders, introducing particles of material from said shredder together with particles of thermoplastic material and a particulate filler material into a high intensity and intimately mixer to form a batch of material to be mixed, intensely mixing said batch of material, comprising said particles of thermoplastic material, said particles from said shredder and said particulate filler material, in order to heat the mixture by friction, bring, said thermoplastic material to a viscous molten state, to produce a heated mass of hot particles of roofing material and filler material coated with molten thermoplastic, then molding said heated mass under pressure into a desired end product.

2. A method as claimed in claim 1 in which said shredded roofing material includes particles of asphalt shingles.

3. A method as claimed in claim 1 in which said batch of material comprises by weight from about 30% to 50% of roofing particles, 30% to 50% of filler particles, and 10% to 40% of thermoplastic particles.

4. A method as claimed in claim 3 in which said shredded roofing particles include particles of asphalt roofing material.

5. A method as claimed in claims 3 or 4 in which said filler material comprises sand.

6. A method as claimed in claims 3 or 4 in which said thermoplastic particles are particles of recycled thermoplastic material.

7. A method as claimed in claims 3 or 4 in which said filler particles are sand and said thermoplastic particles are particles of recycled thermoplastic material.

8. A method as claimed in claims 1, 2 or 3 which is carried out at the site at which said roofing material is stripped.

9. A method of recovering value from materials stripped from the roof of a building during roof repairs or reroofing, said method comprising transporting vehicle mounted equipment including a shredder, a high intensity mixer, and a compression mold to the site of said building, feeding said stripped roofing material into said shredder to produce shredded roof particles or pieces, feeding said roof particles or pieces into said mobile mixer together with particles of thermoplastic material and a particulate filler material to form a batch mixture, intensely mixing said batch mixture in said mixer to produce a heated mass of hot particles of roofing material and filler material, coated and bound together with molten thermoplastic, then molding said heated mass under pressure into a desired end product.

10. A method as claimed in claim 9 in which said shredded roofing material includes particles of asphalt shingles.

11. A method as claimed in claim 9 in which said batch of material comprises from about 30% to 50% shredded roofing particles, 30% to 50% filler particles, and 10% to 40% thermoplastic particles, said percentages being by weight.

12. A method as claimed in claim 11 in which said shredded roofing particles include particles of asphalt roofing.

13. A method as claimed in claims 11 or 12 in which said filler particles comprise sand.

14. A method as claimed in claims 11 or 12 in which said thermoplastic particles are particles of recycled thermoplastic material.

15. A method as claimed in claims 11 or 12 in which said filler particles are sand and said thermoplastic particles are particles of recycled thermoplastic material.

* * * * *